United States Patent [19]

Kusaka

[11] Patent Number: 4,639,790
[45] Date of Patent: Jan. 27, 1987

[54] IMAGE INPUT APPARATUS

[75] Inventor: Satoshi Kusaka, Kanagawa, Japan

[73] Assignee: Sony Corporation, Tokyo, Japan

[21] Appl. No.: 683,684

[22] Filed: Dec. 19, 1984

[30] Foreign Application Priority Data

Dec. 19, 1983 [JP] Japan .................. 58-239409

[51] Int. Cl.$^4$ .................. H04N 1/10; H04N 1/22
[52] U.S. Cl. .................. 358/293; 358/294; 358/282; 358/285
[58] Field of Search .............. 358/293, 294, 285, 282, 358/256; 382/54, 53

[56] References Cited

U.S. PATENT DOCUMENTS

| | | | |
|---|---|---|---|
| 3,052,755 | 9/1962 | Garfield | 358/293 |
| 3,064,078 | 11/1962 | Garfield | 358/293 |
| 3,238,501 | 3/1966 | Mak et al. | 358/285 |
| 3,541,248 | 11/1970 | Young | 358/294 |
| 3,993,865 | 11/1976 | Browne et al. | 358/285 |
| 4,319,283 | 3/1982 | Ozawa et al. | 358/286 |
| 4,490,852 | 12/1984 | Sahni | 358/282 |
| 4,491,963 | 1/1985 | Belleancre | 358/282 |
| 4,513,325 | 4/1985 | Itoch | 358/280 |

Primary Examiner—Henry C. Yuen
Attorney, Agent, or Firm—Hill, Van Santen, Steadman & Simpson

[57] ABSTRACT

An image input apparatus is disclosed, which comprises a running roller manually rolled along an image information surface for the scanning thereof, position detecting means for detecting the position of the running roller according to the rotation thereof, a line sensor for reading out image information of the image information surface, a line sensor driving circuit for driving the line sensor according to a control pulse signal having a constant cycle period, and memory means for storing the output of the line sensor. The output of the position detecting means is utilized as address data of a memory to accurately store image information in the memory.

4 Claims, 11 Drawing Figures

IMAGE INPUT APPARATUS

BACKGROUND OF THE INVENTION

1. Field of the Invention

This invention relates to an image input apparatus.

2. Description of the Prior Art

Facsimile apparatus, plane paper copier, diazotype copier or the like are well known as image input apparatus.

Any of these prior art image input apparatus has drawbacks that it is difficult to selectively input a small portion of image and the shape is large and undesired for portability. As a hand-held type input apparatus, there is an optical scanner disclosed in U.S. Pat. specification No. 3,541,248. In this optical scanner, image information cannot be read out accurately if the scanning speed is reduced during the input of the image. In addition, it takes some time before the voltage of a power source rises to a predetermined level from the instant of closure of a power source switch immediately before use. Therefore, immediately after the power source switch is turned on, the brightness of the light source is below a predetermined necessary level, so that normal operation cannot be obtained. Further, the optical scanner noted in U.S.P does not have any memory means, so that the input image signal has to be instantly processed to produce its hard copy.

SUMMARY OF THE INVENTION

The present invention has been intended in the light of the above prior art problems, and it has an object of providing a novel image input apparatus, with which a small portion of an image can be readily selectively input, and which is small in size, easy to operate and can be conveniently carried along.

Another object of the present invention is to provide an image input apparatus, which comprises means for storing input image.

A further object of the present invention is to provide an image input apparatus, which comprises position detecting means and permits reading of image in a correct positional relation to it by manually scanning it and also permits accurate reading of image even at a reduced scanning speed.

A still further object of the present invention is to provide an image input apparatus, which comprises means for writing read-out image information in a compressed form in a memory to thereby permit input of a greater amount of image, and which is thus suited for use with a memory having a small storage capacity such as a semiconductor card.

A yet further object of the present invention is to provide an image input apparatus, which comprises means for detecting the brightness of light from a light source and means for releasing the lock of a running roller when a predetermined level is reached by the brightness being detected, thereby permitting input of only proper image information without input of defective image information due to insufficient light quantity.

A yet another object of the present invention is to provide an image input apparatus, which comprises a light source for illuminating an image information surface, a running roller rolled along the image information surface for scanning the image information surface, position detecting means coupled to the running roller, a line sensor for reading image information according to light provided from the light source and reflected by the image information surface, a line sensor driving circuit for driving the line sensor, and memory means for storing the output from the line sensor, a detection output of the position detecting means being utilized as a position information signal representing the position of image information signal stored in the memory means.

The above-mentioned and other objects and features of the invention will become apparent from the following detailed description taken in conjunction with the drawings which indicate embodiments of the invention.

DESCRIPTION OF THE PREFERRED EMBODIMENTS

Figure 1:
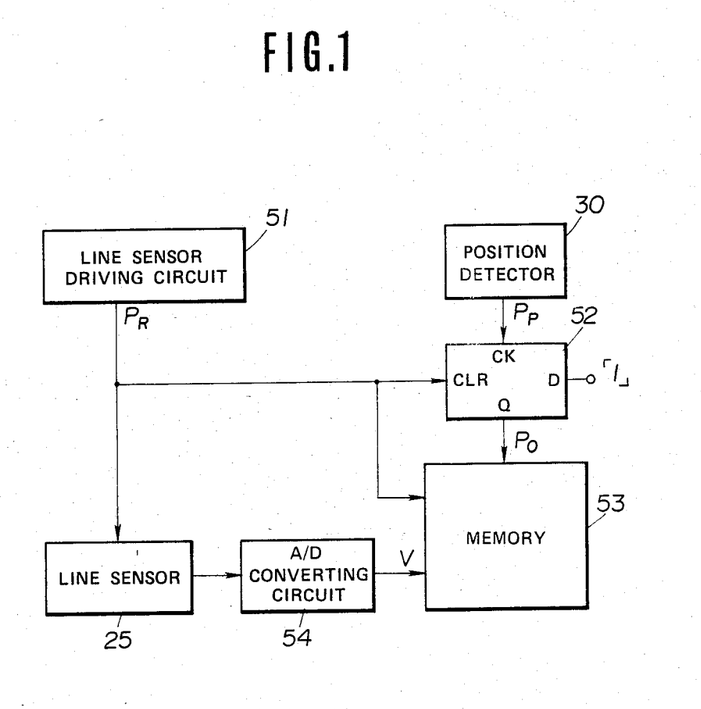
FIG. 1 is a block diagram showing an image signal processing system in an embodiment of the image input apparatus according to the present invention.

FIG. 1 is a block diagram showing an image signal processing system of one embodiment of the image input apparatus according to the present invention. The system of FIG. 1 will be described later in detail, and an embodiment of the image input apparatus 100 according to the present invention will be described with reference to FIGS. 2 through 5.

The image input apparatus 100 has a casing 10 having an opening 11 provided at the bottom. A linear light source 21, which may be a tungsten lamp or a light-emitting diode, is accommodated in the casing 10 near the opening 11 for illuminating a surface Pd bearing an image to be input. A light-receiving element 22 for detecting the intensity of light of the linear light source 21 is also accommodated in the casing 10. A half mirror 23 is provided on top of the opening 11. Light entering the casing 10 through the opening 11 is partly transmitted and partly reflected by the half mirror 23 to reach a window 12 provided on top of the casing 10 and also a rod lens array 24 accommodated in the casing 10. The light reaching the window 12 permits the user to input image while confirming it with the eyes. The rod lens array 24 consists of distributed refractive index type lenses (with a diameter of 1 to 2 mm) arranged in a plate-like array such that the refractive index increases toward the center. The optical axis of the rod lens array 24 extends in the horizontal direction. Light from the rod lens array 24 is incident on a CCD line sensor (hereinafter referred to as line sensor) 25 having a light incidence surface 25a facing an end face 24a of the rod lens array 24. The surface Pd bearing an image to be input is illuminated by the linear light source 21 provided near the opening 11, and the image is focused in the same scale on the light incidence surface 25a of the line sensor 25 through the half mirror 23 and rod lens array 24.

Figure 3:
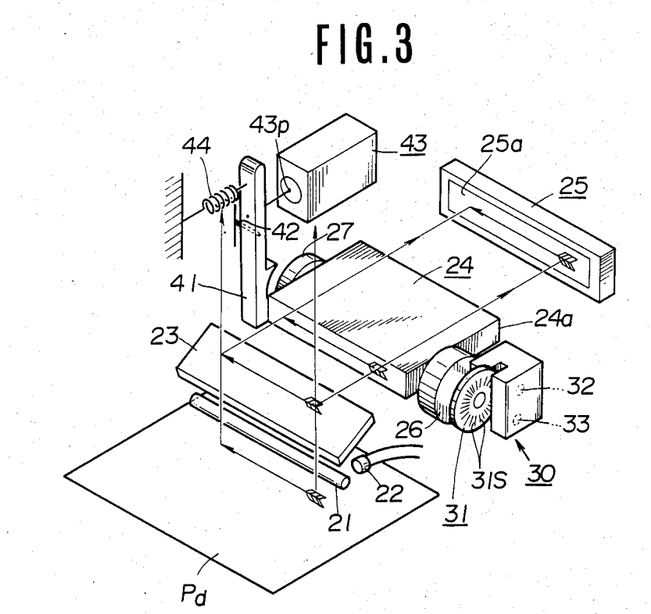
FIG. 3 is a schematic exploded perspective view showing the internal construction of the same image input apparatus.
Figure 4:
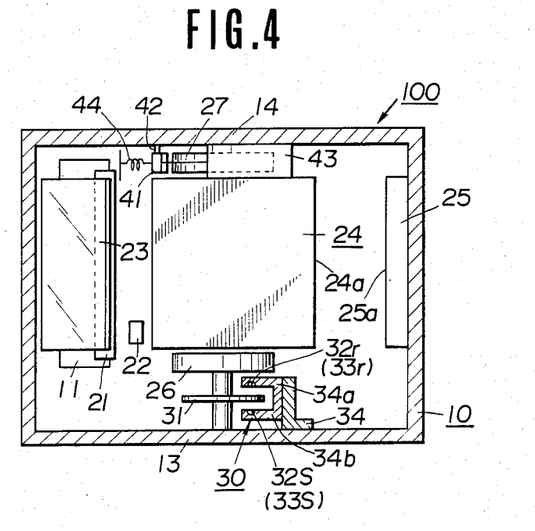
FIG. 4 is a schematic plan view of the same image input apparatus.
Figure 5:
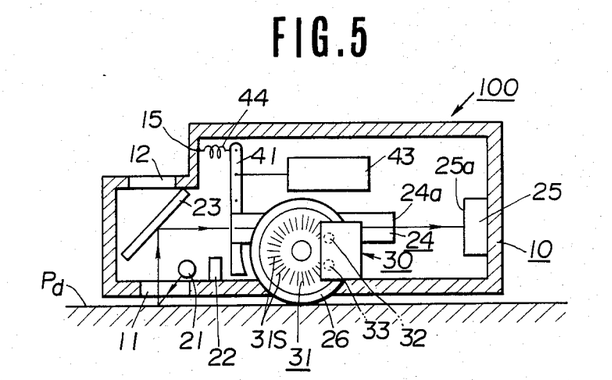
FIG. 5 is a schematic side view showing the same image input apparatus.

Rollers 26 and 27 are rotatably supported in lower portions of opposite side walls 13 and 14 of the casing 10. The image input apparatus 100 can be moved over the surface Pd for scanning.

A position detector 30, which consists of an optical rotary encoder, includes a rotary detection slit disk 31 rotatable in unison with the roller 26 and two rotation detectors 32 and 33, each of which consists of facing elements facing each other on the opposite sides of the slit disk 31.

The slit disk 31 has a number of transparent slits 31s provided along the edge at a uniform interval. The rotation detectors 32 and 33 consist of respective light-emitting elements 32s and 33s and light-receiving elements 32r and 33r. They are provided on facing inner sides of pair arms 34a and 34b of a holder 34 secured to the side wall 13 of the casing 10, the slit disk 31 intervening between the arms 34a and 34b. They make an angle of $n\theta° + \theta°/4$ degrees ($\theta°$ being the angular pitch of the slits 31s and n being n=0, 1, 2, ...) with respect to the axis of rotation of the slit disk 31. With the two rotation sensors 32 and 33 arranged in the above way, it is possible to detect the direction of rotation of the slit disk 31 as is well known in the art.

Figure 7:
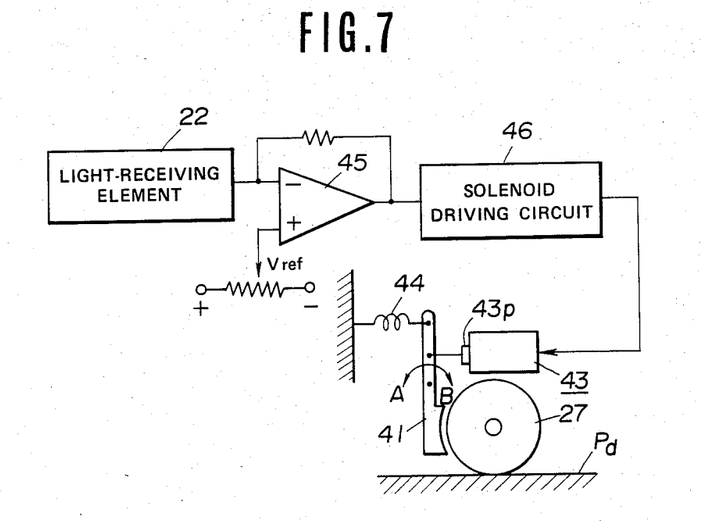
FIG. 7 is a schematic representation of a roller control system.

The rotation of the roller 27 is controlled by a brake member 41, which has a rotary shaft 42 projecting substantially from its longitudinal center and rotatably mounted in the side wall 14 of the casing 10. A solenoid 43 secured to the side wall 14 has a plunger 43p, which is coupled to an upper portion of the brake member 41 above the rotary shaft 42. The brake member 41 is spring biased by a spring 44 having one end tied to its top and the other end tied to a wall portion 15 of the casing 10.

A microswitch (not shown) is provided in an interlocked relation to the shaft of the roller 27 as means for rendering the image input apparatus 100 operative. When the image input apparatus 100 is placed on the surface Pd bearing the image to be input by holding its with a hand, the microswitch noted above is closed by the pressure exerted between the image input apparatus 100 and surface Pd, thus rendering operative the linear light source 21, line sensor 25 or the like.

Figure 6:
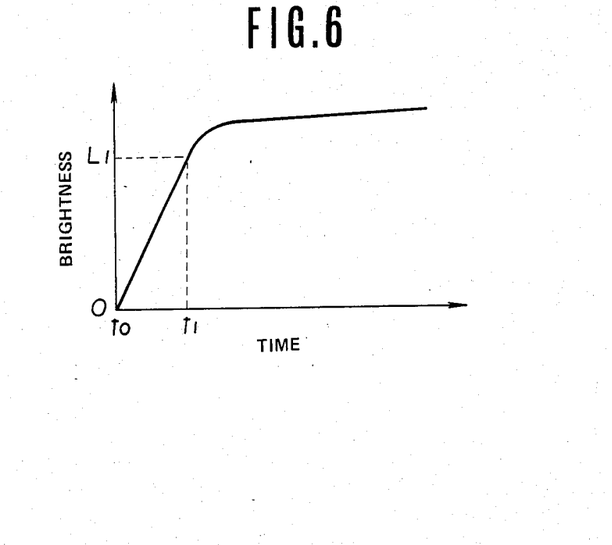
FIG. 6 is a graph showing an embodiment of rising characteristic of a linear light source.
Figure 8:
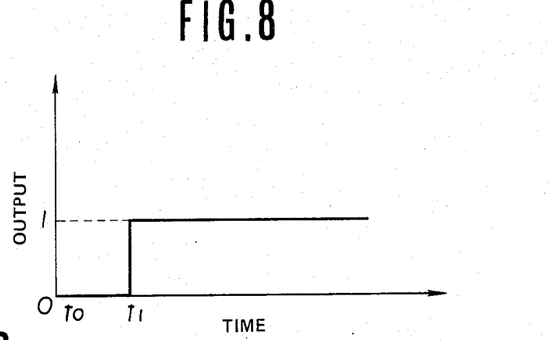
FIG. 8 is a graph showing the output of a comparator in the roller control system.

The linear light source 21 has a rising characteristic as shown in FIG. 6. As is shown, its light intensity or brightness reaches a predetermined level $L_1$ required for operation at an instant $t_1$ after the lapse of a certain period of time $t_{1-t_0}$ (e.g., 0.2 to 0.3 second) from the instant to of its closure. Therefore, if the input of the image is started before the instant $t_1$ of reaching of the predetermined brightness $L_1$, defective input image information results from insufficient quantity of light. Accordingly, with the image input apparatus 100 the roller 27 is held locked by the brake member 41 so that the apparatus 100 cannot be moved along the surface Pd until the brightness of the linear light source 21 reaches the predetermined level $L_1$. The light-receiving element 22, which detects the brightness of the linear light source provided near the opening 11, is connected to an inverted input terminal of a comparator 45, with a reference voltage $V_{ref}$ applied to a non-inverted input terminal thereof. The output terminal of the comparator 45 is connected to a solenoid driving circuit 46 for driving the solenoid 43. The reference voltage $V_{ref}$ applied to the comparator 45 is set such that the output of the comparator 45 is inverted from a low level to a high level at the instant $t_1$ of reaching of the predetermined brightness level $L_1$, as shown in FIG. 8.

With this arrangement, during the period from the instant $t_0$ when the linear light source 21 is turned on till the instant $t_1$ the output of the comparator 45 is held at the low level, and during this time the solenoid 43 is thus not driven by the solenoid driving circuit 46. During this time, the roller 27 is thus held locked by the brake member 41 biased by the spring 44 in the direction of arrow A. At the instant $t_1$ when the predetermined brightness level $L_1$ is reached by the brightness of the linear light source 21, the output of the comparator 45 is inverted to the high level, whereupon the solenoid 43 is driven by the solenoid driving circuit 46 to turn the brake member 41 in the direction of arrow B so as to release the roller 27 from the locked state. After the instant $t_1$ the brightness level of the linear light source 21 is above $L_1$, so that the roller 27 remains released from the lock.

With the provision of the above roller control system, it is possible to avoid the input of defective image information due to insufficient quantity of light and permit only normal image information.

Instead of detecting the brightness of the linear light source 21 with the light-receiving element 22, it is also possible to control the operation of the brake member 41 in response to the output of a timer including a counter for counting time. Further, the output of the comparator 45 may be used to control an image signal processing system as described hereinunder as well as the operation of the brake member 41.

Figure 2:
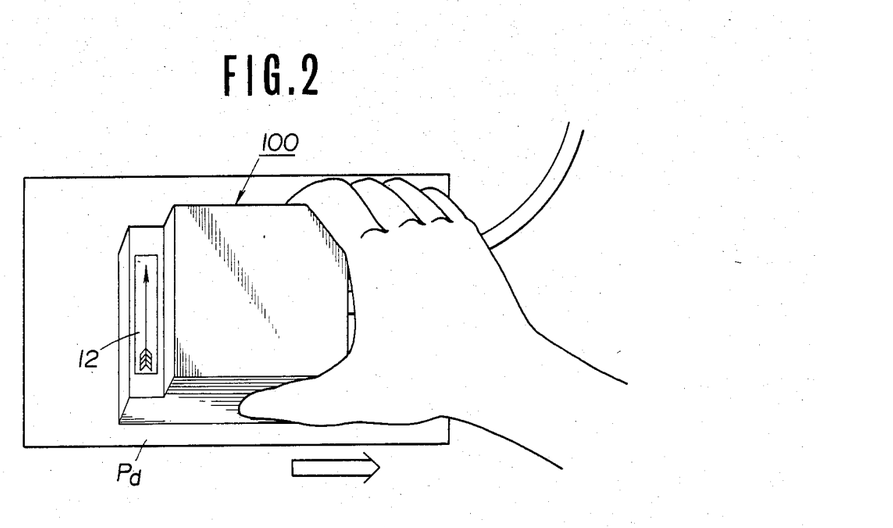
FIG. 2 is a schematic perspective view illustrating the way of use of the same embodiment of the image input apparatus.

The image signal that is obtained from the line sensor 25 is processed in a manner as described hereinunder. As shown in FIG. 1, the line sensor 25 is driven in response to a reset pulse signal $P_R$ having a cycle period T provided from a line sensor driving circuit 51. The reset pulse signal $P_R$ from the line sensor driving circuit 51 is fed to a clear terminal CLR of a D flip-flop 52 and also to a memory 53. The memory 53 may be a magnetic disk or a magnetic tape. As a further alternative, it may be a semiconductor card 64 as shown in different embodiment of FIG. 11 to be described later. In the embodiment of FIG. 2, the memory 53 is provided outside the image input apparatus 100. A position detection pulse signal $P_P$ is fed from the position detector 30 noted above to a clock input terminal CK of the D flip-flop 52, and data "1" is fed to a data input terminal D of the flip-flop. The image signal obtained from the line sensor 25 is converted by an analog-to-digital (A/D) converter 54 into a digital signal, which is written as image data V in the memory 53. The write address of the memory 53 at this time is determined by the reset pulse signal $P_R$ and an output pulse signal $P_0$ from an output terminal Q of the D flip-flop 52. The "row" of the address is determined by the reset pulse signal $P_R$, and the "column" of the address is determined by the output pulse signal $P_0$. One unit $V_{mn}$ of image data is stored in one address $A_{mn}$. The resolution in this case is 7 to 10 units of data per mm.

Figure 9:
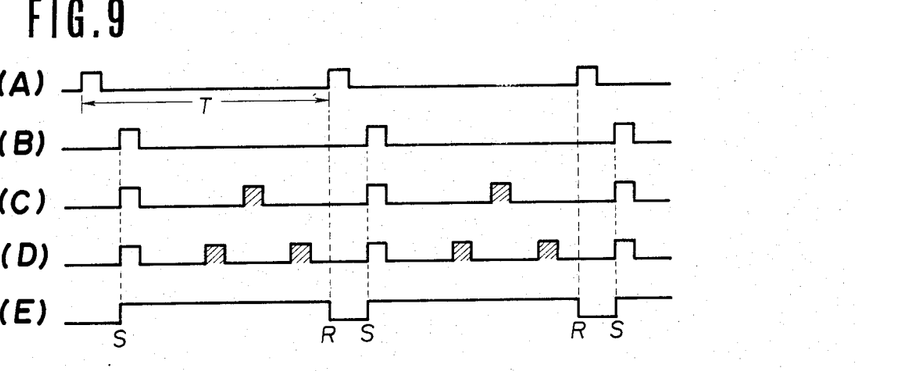
FIG. 9 is a time chart illustrating the operation of the image signal processing system shown in FIG. 1.

The operation will now be described in greater detail with reference to the time chart of FIG. 9. The reset pulse signal $P_R$ has a fixed cycle period T as shown in (A). On the other hand, the number of position detection pulse signals $P_P$ provided from the position detector 30 during the period T varies according to the speed of manual scanning of the image input apparatus 100 as shown in (B) to (D). In the cases (C) and (D), the scanning speed is respectively $2v_0$ and $3v_0$ where $v_0$ is the scanning speed in the case (B).

The D flip-flop 52, which is receiving data "1" fed to the data input terminal D at all time, is set by the position detection pulse signal $P_R$ and reset by a reset pulse signal $P_R$. Thus, in either of the cases of the scanning speeds $v_0$, $2v_0$ and $3v_0$, the pulses shown shaded are removed. The output pulse signal $P_0$ is as shown in (E). It is to be understood that in the image data V stored in the memory 53 at the scanning speed $v_0$, at the scanning speed $2v_0$ one unit of data among two units of image data V is ignored, and at the speed of $3v_0$ two of three data are ignored.

Figure 10:
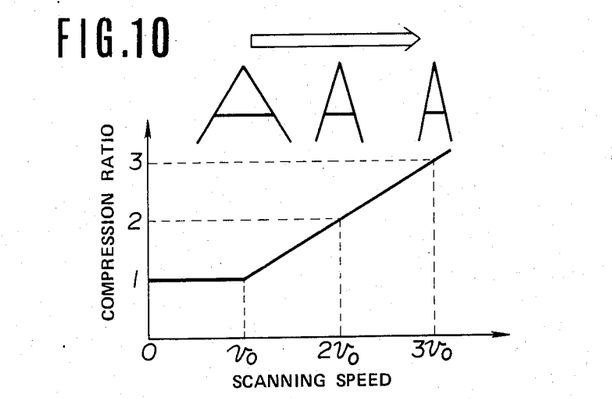
FIG. 10 is a graph showing the image compression ratio plotted against the scanning speed of the embodiment of the image input apparatus.

In other words, when the scanning speed is 0 to $v_0$, the compression ratio of the image to be input is fixed at 1, while when the scanning speed is $v_0$ to $3v_0$ the compression ratio is varied linearly from 1 to 3, whereby the image data V is written in the memory 53, as shown in FIG. 10. To write a character "A" as input image with the scanning direction as shown by arrow in FIG. 10, the characterr "A" written in the memory 53 is compressed laterally to one-half when the scanning speed is $2v_0$ and to one-third when the scanning speed is $3v_0$ compared to when the scanning speed is 0 to $v_0$.

With the image signal processing system as described above, it is possible to input image with a compression ratio of unity, i.e., without compression, by moving the image input apparatus 100 at a scanning speed in a range of 0 to $v_0$, while inputting an image, which is not so important can be sufficiently recognized with a reduced number of image data units, by compressing it by moving the image input apparatus 100 at an increased speed such that the scanning speed is above $v_0$. By so doing, more image can be input, which is desirable in case where the memory 53 has a small storage capacity such as the semiconductor card 64 in the different embodiment of the present invention shown in FIG. 11.

If it is possible to vary the image compression ratio by providing an N-step counter (or 1/N frequency divider) between the position detector 30 and D flip-flop 52. Further, by omitting the D flip-flop 52, the image compression ratio may be fixed at N irrespective of the scanning speed.

The procedure of use and operation of this embodiment of the image input apparatus 100 will now be described.

When the image input apparatus 100 is placed on the surface Pd bearing an image to be input by holding it with a hand, as shown in FIG. 2, the microswitch (not shown) is closed by the pressure exerted between the image input apparatus 100 and surface Pd so that the operation of the image input apparatus 100 is started. Until the brightness of the linear light source 21 reaches the predetermined level $L_1$, the roller 27 is held locked by the brake member 41 as mentioned before, so that the image input apparatus 100 cannot be moved along the surface Pd. Thus, the input of defective image signal can be prevented. When the brightness of the linear light source 21 reaches the predetermined level $L_1$, the solenoid 43 is driven to release the lock of the roller 27 by the brake member 41. As a result, an image index signal is generated, and at the same time a reset pulse signal $P_R$ is generated from the line sensor driving circuit 51, whereby the image right beneath the opening 11 is read in the line sensor 25. As the image input apparatus 100 is moved manually along the surface Pd at a scanning speed in a range of 0 to $v_0$, for instant, the rollers 26 and 27 and slit disk 31 are rotated with this movement. When the first slit is brought to a position between the light-emitting element 32s and light-receiving element 32r of the rotation detector 32 with the rotation of the slit disk 31, a detection pulse signal $P_P$ is generated. By this position detection pulse signal $P_P$ the column of the corresponding address of the memory 53 is determined, and the "row" of the address is determined by the reset pulse signal $P_R$, whereby image data V1 of a linear surface first read in the first address (i.e., first unit of data) is written in the memory 53. Meanwhile, with the movement of the image input apparatus 100, image of a second linear surface adjacent to the first linear surface is focused on the light incidence surface 25a of the line sensor 25 to be read in. When the slit is brought to a position between the light-emitting element 33s and light-receiving element 33r of the rotation detector 33 with further movement of the image input apparatus 100, a second position detection pulse signal $P_P$ is generated, whereby a second unit data $v_2$ is read out from the line sensor 25 and written in the second address of the memory 53. At the same time, a third linear surface is read in. Like operation is performed every time the image input apparatus 100 is moved by a distance corresponding to the pitch of the slits 31s. The image input apparatus 100 normally may be moved at a low speed so that the scanning speed is in a range of 0 to $v_0$, while it may be moved at a high speed so that the scanning speed is higher than $v_0$ when inputting an image, which is not so important and can be sufficiently recognized even with a reduced number of data units.

Further, in case when the direction of movement of the image input apparatus 100 is reversed while image is being input at a scanning speed within the range of 0 to $v_0$, the reversal of direction is detected by the co-operation of the two rotation detectors 32 and 33, whereby a reverse movement detection signal is generated. The reverse movement detection signal is fed to the memory 53, whereby data that has been written in the memory 53 is erased progressively from the end every time the position detection pulse signal $P_P$ is fed from the position detector 30. For example, when the image input apparatus 100 is moved backwards to an extent corresponding to n data units after N data units have been input, (N−n) units of data remain in the memory 53, and the image input apparatus 100 at this time is at a position to input the (N−n+1)th unit of data. When the image input apparatus 100 is subsequently moved again forwards for n units of data, N units of data recovered in the memory 53. In this way, data before and after the reversal of direction of movement can be continuously input without possibility of overlap or jump-out of data.

When the image input apparatus 100 is separated from the surface Pd after required data has been input, the pressure on the roller 27 is removed to open the microswitch (not shown), whereby an end signal is written at the end of the input image signal. Then, the image input apparatus 100 is rendered inoperative.

Image corresponding to the image data written in the memory 53 may be reproduced on an image display unit such as a cathode-ray tube by mounting the memory 53 in a suitable reading apparatus. Also, its hard copy may be obtained with a separately provided printer.

A different embodiment of the present invention will now be described with reference to FIG. 11.

Figure 11:
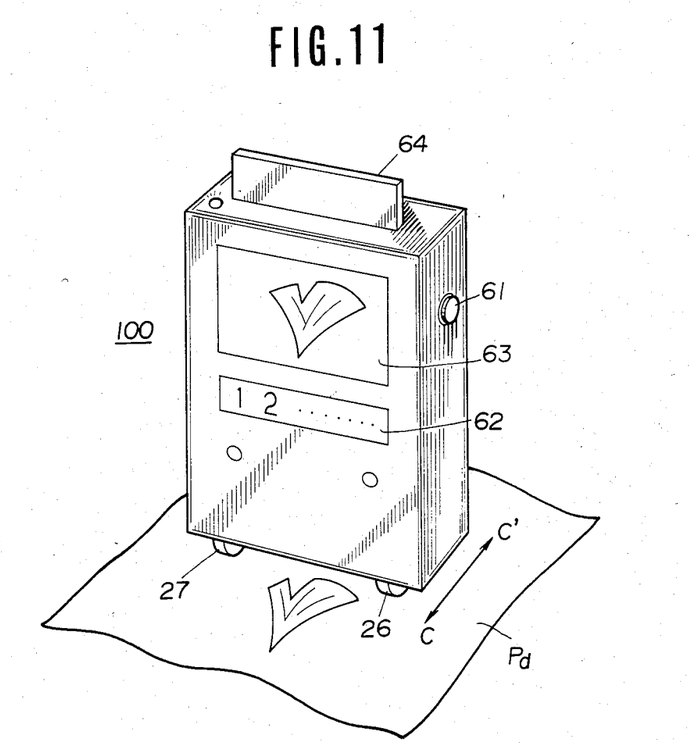
FIG. 11 is a schematic perspective view showing a different embodiment of the image input apparatus according to the present invention.

Referring to FIG. 11, reference numeral 61 designates a knob of a control switch (power switch). The image input apparatus 100 is rendered operative when the control switch is closed by the knob 61. More specifically, at this time the illumination light source is turned on, an index signal of the input image is generated, and the read-in memory address is set. Further, the residual memory capacity is displayed on the display unit to prevent the error of the input image due to overflow of the image. The display unit 62 may be switched for the display of the remaining battery life so that failure of operation due to battery which can no longer supply power can be prevented. Reference numeral 63 designates an image display unit, which comprises liquid crystal or a flat cathode-ray tube as a display element and can suitably display image data recorded on the semiconductor card 64.

Desired image may be input by manually moving the apparatus along surface Pd in the direction of arrow C or C'. When the control switch is opened by operating the knob 61 after the input of image is completed, an end signal is written at the end of the input image in the line sensor 25, thus bringing an end to the image input.

As has been described in the foregoing, according to the present invention, small portion of a selective image can be input by leading light of the light source after reflection by that portion of the original to the line sensor which is controlled by the position detecting means. In addition, only detection pulses from the position detecting means that are provided during one cycle period of the control pulse signal from the line sensor driving circuit are rendered effective, and an output pulse is formed on the basis of these effective pulses. For each output pulse, an image signal is provided from the line sensor and written in the memory. Further, the lock of the roller noted above is released when upon reaching of a predetermined brightness level by the detected brightness of the light source.

What is claimed is:

1. An image input apparatus comprising:
   a housing;
   a light source provided within said housing for illuminating an object surface;
   a roller rotatably supported by said housing member so as to contact with said object surface;
   postion detecting means said roller for detecting a rotation thereof;
   a line sensor provided within said housing member for reading image information of said object surface through a lens array according to light provided from said light source and reflected by said image information surface;
   a line sensor driving circuit for driving said line sensor;
   memory means for storing a first output signal from said line sensor in accordance with a second output signal from said position detecting means representing the position of image information signal stored in said memory means;
   a braking means for locking said roller; and
   a light receiving means fro detecting the brightness of light from said light source, and means for releasing said braking means at the time the output of said light receiving means equal to a predetermined value.

2. The image input apparatus according to claim 1, wherein said memory means is a memory card.

3. The apparatus according to claim 1, wherein said position detecting means includes a slit disk mounted on the shaft of said roller.

4. The apparatus according to claim 1 wherein said line sensor reads said image information of said object surface through a lens array.

* * * * *